(12) United States Patent
Avritch et al.

(10) Patent No.: US 8,515,941 B1
(45) Date of Patent: Aug. 20, 2013

(54) SYSTEM FOR UNIQUE AUTOMATED WEBSITE GENERATION, HOSTING, AND SEARCH ENGINE OPTIMIZATION

(75) Inventors: Peter S. Avritch, Sausalito, CA (US); James R. Du Molin, Belvedere, CA (US)

(73) Assignee: Internet Dental Alliance, Inc., Tiburon, CA (US)

(*) Notice: Subject to any disclaimer, the term of this patent is extended or adjusted under 35 U.S.C. 154(b) by 0 days.

(21) Appl. No.: 13/136,491

(22) Filed: Aug. 1, 2011

Related U.S. Application Data

(60) Provisional application No. 61/374,762, filed on Aug. 18, 2010.

(51) Int. Cl.
*G06F 7/06* (2006.01)

(52) U.S. Cl.
USPC .................... 707/711; 707/803; 715/234

(58) Field of Classification Search
CPC ............. G06F 17/30864; G06F 17/30011; G06F 17/30699; G06Q 10/10
USPC ............. 707/711, 999.102, 999.01, 803; 709/219; 715/234
See application file for complete search history.

(56) References Cited

U.S. PATENT DOCUMENTS

| | | | |
|---|---|---|---|
| 6,957,218 B1* | 10/2005 | Wyatt | 1/1 |
| 7,152,207 B1 | 12/2006 | Underwood | |
| 7,536,641 B2* | 5/2009 | Rosenstein et al. | 715/234 |
| 7,600,188 B2 | 10/2009 | Good | |
| 7,958,127 B2* | 6/2011 | Edmonds et al. | 707/748 |
| 8,301,743 B2* | 10/2012 | Curran et al. | 709/223 |
| 8,359,616 B2* | 1/2013 | Rosenberg et al. | 725/42 |
| 8,396,857 B2* | 3/2013 | Kamel et al. | 707/711 |
| 2003/0028419 A1* | 2/2003 | Monaghan | 705/10 |
| 2003/0120659 A1* | 6/2003 | Sridhar | 707/100 |
| 2004/0123244 A1* | 6/2004 | Campbell et al. | 715/517 |
| 2004/0167989 A1* | 8/2004 | Kline et al. | 709/245 |
| 2004/0215719 A1 | 10/2004 | Altshuler | |
| 2005/0234921 A1* | 10/2005 | King et al. | 707/10 |
| 2006/0248442 A1* | 11/2006 | Rosenstein et al. | 715/501.1 |
| 2007/0016577 A1* | 1/2007 | Lasa et al. | 707/5 |
| 2007/0168465 A1* | 7/2007 | Toppenberg et al. | 709/218 |
| 2007/0174324 A1* | 7/2007 | Palapudi et al. | 707/102 |
| 2007/0204013 A1 | 8/2007 | Castrucci | |
| 2007/0299985 A1* | 12/2007 | Craig et al. | 709/245 |
| 2007/0299986 A1* | 12/2007 | Craig et al. | 709/245 |
| 2008/0052668 A1* | 2/2008 | Craig et al. | 717/111 |

(Continued)

OTHER PUBLICATIONS top10bestwebsitehosting.com, "The Top 15 WebSiteBuilder Web Hosting Sites", copyright 2009-2013, 4 pages, accessed online at <http://www.top10bestwebsitehosting.com/WebSiteBuilders-Comparison> on Apr. 9, 2013.*

(Continued)

*Primary Examiner* — Phuong Thao Cao
(74) *Attorney, Agent, or Firm* — Beyer Law Group LLP

(57) ABSTRACT

A technique and system for automatically generating and hosting a plurality of unique websites having conceptually similar content within a business market or profession is described. The system generates both unique visible content and also unique invisible content read by search engines but not typically visible to end users. Each website has a plurality of pages which are visually and structurally distinct, such that they may all coexist on the Internet in close geographic proximity without appearing to website visitors and search engines as being nearly identical to one another.

17 Claims, 12 Drawing Sheets

(56) References Cited

U.S. PATENT DOCUMENTS

| | | | |
|---|---|---|---|
| 2008/0066080 A1* | 3/2008 | Campbell | 719/314 |
| 2008/0319950 A1* | 12/2008 | Lasa et al. | 707/3 |
| 2009/0070235 A1* | 3/2009 | Mehta et al. | 705/27 |
| 2009/0094137 A1* | 4/2009 | Toppenberg et al. | 705/27 |
| 2009/0222416 A1* | 9/2009 | Tymoshenko et al. | 707/3 |
| 2009/0235158 A1* | 9/2009 | Rosenstein et al. | 715/234 |
| 2009/0320119 A1* | 12/2009 | Hicks et al. | 726/9 |
| 2010/0017703 A1* | 1/2010 | Glickman et al. | 715/234 |
| 2010/0114864 A1* | 5/2010 | Agam et al. | 707/709 |
| 2010/0235411 A1* | 9/2010 | Bray | 707/812 |
| 2011/0055217 A1* | 3/2011 | Kamel et al. | 707/741 |
| 2011/0137721 A1* | 6/2011 | Bansal | 705/14.41 |
| 2012/0047120 A1* | 2/2012 | Connolly et al. | 707/706 |

OTHER PUBLICATIONS

GoDaddy.com, "Website Builder—Create Your Own Website in Minutes", copyright 1999-2013, 6 pages, accessed online at <http://www.godaddy.com/hosting/website-builder.aspx?> on Apr. 10, 2013.*

CustomWebChoice.com, "Do you need a Custom Website?", 2013, 2 pages, accessed online at <http://www.customwebchoice.com/deals/> on Apr. 9, 2013.*

* cited by examiner

160

`<h2>`See What {ServiceArea#1} Cosmetic Dentistry Can Offer You`</h2>`

`<p>`It's time to get the beautiful smile you've always wanted. {ServiceArea#1} cosmetic dentistry with {FullName}, {Accreditation} is your best choice for a full range of dental makeover options, and we'll work with your busy schedule.`</p><p>` Dr. {LastName} and {his-her} staff can fix chipped, cracked or stained teeth with gorgeous porcelain veneers or tooth bonding. At {Company} we also have years of experience with natural-looking porcelain crowns and tooth-colored composite fillings.`</p>`

`<p>`Call now for an appointment for {ServiceArea#1} cosmetic dentistry with Dr. {LastName} at {Phone} or just fill out our simple online form. Please don't hesitate to contact {Company} if you have any questions. We are here to help!`</p><h2>`{ServiceArea#1} Cosmetic Dentistry for a Great New Smile`</h2>`

`<p>`Now you can have the dazzling smile you've always dreamed about. {ServiceArea#1} cosmetic dentistry with Dr. {FullName} should be your first choice for a wide range of affordable dental makeover options.`</p><p>`Dr. {LastName} and {his-her} friendly staff are highly-trained in fixing chipped, cracked or stained teeth with lovely new porcelain veneers or tooth bonding. At {Company} we also offer great, natural-looking porcelain crowns and tooth-colored composite fillings.`</p>`

`<p>`Call now for an appointment for {ServiceArea#1} cosmetic dentistry with Dr. {LastName} at {Phone} or just fill out our simple online form. Please don't hesitate to contact {Company} if you have any questions. We look forward to speaking with you!`</p><h2>`Find Out What {ServiceArea#1} Cosmetic Dentistry Can Offer`</h2>`

`<p>`At {Company} we're always happy to talk to you, listen to your needs and wishes for your dental experience, then discuss all the modern cosmetic dentistry options available to get you the most perfect teeth possible.`</p><p>`If you're interested in whiter teeth, we offer a variety of gentle bleaching procedures that protect your enamel while brightening your smile. Dr. {LastName} also offers natural-looking porcelain veneers, dental crowns and tooth-colored composite fillings to make your new smile sparkle.`</p>`

`<p>`Call now for an appointment for {ServiceArea#1} cosmetic dentistry with Dr. {LastName} at {Phone} or just fill out our simple online form. Please don't hesitate to contact {Company} if you have any questions. We are here to help, and look forward to speaking with you!`</p><h2>`{ServiceArea#1} Cosmetic Dentistry for a Terrific New Smile`</h2>`

`<p>`At {Company} we provide a wide variety of cosmetic dentistry options available to get you the most perfect teeth possible, including natural-looking porcelain veneers and tooth-colored composite fillings.`</p><p>`If you're interested in a whiter smile, we offer a range of gentle bleaching procedures that protect your enamel while brightening your smile. Dr. {LastName} is also experienced in dental bridges and dental crowns to make sure your smile dazzles everyone.`</p>`

`<p>`Call now for an appointment for {ServiceArea#1} cosmetic dentistry with Dr. {LastName} at {Phone} or just fill out our simple online form. Please don't hesitate to contact {Company} if you have any questions. We are here to help, and look forward to speaking with you!`</p>`

FIG. 4

| 170 | 171 |
|---|---|
| Content Before Personalization | Content After Personalization |
| Prevent decay with dental sealants. Ask Dr. {LastName} in {ServiceArea#1}, {ST} - {Company} | Prevent decay with dental sealants. Ask Dr. Smith in Los Angeles, CA - Nice Smile Dental Offices |
| <p>A good rule of thumb is to schedule your child's first visit to {Company} in {ServiceArea#1} before your child turns one since most children get their first tooth between 6 and 12 months. Start regular preventative visits to keep your child's teeth health and smile beautiful.</p> <p>Please call {Company} in {ServiceArea#1} at {Phone} for more information or to make an appointment with {FullName}, {Accreditation}.</p> | <p>A good rule of thumb is to schedule your child's first visit to Nice Smile Dental Offices in Los Angeles before your child turns one since most children get their first tooth between 6 and 12 months. Start regular preventative visits to keep your child's teeth health and smile beautiful.</p> <p>Please call Nice Smile Dental Offices in Los Angeles at (818)555-1212 for more information or to make an appointment with John Smith, D.D.S..</p> |
| Free {focuskeyword1} smile analysis for the {ServiceArea#1} {ST} area from {Company} with {FullName} {Accreditation} and team. Call {Phone} today. | Free Invisalign smile analysis for the Los Angeles CA area from Nice Smile Dental Offices with John Smith, D.D.S. and team. Call (818)555-1212 today. |

*FIG. 5*

SYSTEM FOR UNIQUE AUTOMATED WEBSITE GENERATION, HOSTING, AND SEARCH ENGINE OPTIMIZATION

CROSS-REFERENCE TO RELATED APPLICATIONS

This application claims the benefit of priority under 35 USC §119(e) to U.S. Provisional Patent Application No. 61/374,762, filed on Aug. 18, 2010, and entitled "SYSTEM FOR UNIQUE AUTOMATED WEBSITE GENERATION, HOSTING, AND SEARCH ENGINE OPTIMIZATION," which is incorporated herein by reference for all purposes.

BACKGROUND OF THE INVENTION

The Internet has become a powerful and essential tool for marketing and promoting nearly any kind of business. Prospective customers use search engines and online directories to locate nearby businesses offering the products and services which interest them, with the further hope that they will be able to learn more about these services by visiting these business' respective websites.

As more and more businesses realize the power and importance of maintaining a strong presence on the Internet, the field becomes increasingly more crowded and it becomes even more important to differentiate one's self from local competitors.

In the end, it all comes down to identity and branding. Astute business owners are keenly aware that their online identity factors in considerably toward their ultimate success. Blending in with the competition is simply not acceptable. This includes both the visual appearance of their websites and how their businesses are located through Google™ and other related search services.

Costs are another big factor and concern for many new website owners. Maintaining a unique identity traditionally requires a level of manual customization and attention which drives up costs and frequently becomes a competitive barrier for smaller businesses.

Do-it-Yourself Websites

Creating and maintaining a relevant Internet presence often requires a significant commitment of time and resources, as well as a high level of skill with regard to how to craft websites and be found in the search engines with any kind of frequency. Without the requisite skills of the trade, a do-it-yourself approach toward online marketing is often doomed to fail. And knowing this, business owners quickly turn to a myriad of products and services offered by vendors claiming to make it easier to get up and running quickly and start competing for market share.

The first hurdle to overcome when creating a website is learning HyperText Markup Language (HTML). This is an arcane computer syntax interpreted by web browsers and used universally throughout the Internet to publish web pages. Fortunately, there are a variety of products available to help shield users from most of this; with one of the most popular in recent times being the free Open Source software named WordPress™.

However, being relieved from learning HTML still leaves a host of other obstacles to be dealt with. Somebody still has to write the copy, lay out pages and create dozens of images. And when that's all done, there will be constant maintenance required to keep the site current and optimized to perform well in the search engines.

Ready-Made Templates

In recent years, a multitude of suppliers have emerged who offer ready-made templates to give customers a head start on organizing their websites. At the low end are free and low-cost artistically-pleasing templates which plug directly into WordPress™ and similar content management systems.

For those willing to spend a bit more, it's often possible to find higher caliber templates which even include content, text and images relating to their profession or industry. But even with these, unless they are further customized, purchasers quickly find their sites look identical to those belonging to competitors who may have also purchased the same "stock" template and also failed to customize it.

In the "old days" where nearly all websites were hand crafted, ending up with a visually unique website was a natural benefit of the process. However, as automation comes into play, so does a level of duplication—and customers simply are not happy with this. They want the lower costs offered by advanced automation, but they also want to know that their websites are totally unique; as if hand-crafted by a professional design shop.

Professional Website Design Shops

An even more expensive option is outsourcing. Faced with seeing the enormous amount of time and energy which could easily be consumed trying to create and maintain a quality website, business owners looking to excel or dominate in their respective markets often employ the services of a professional website design shop. Outsourcing holds the promise of getting the job done right without the commitment of one's own time, but it often comes at a steep price—frequently upwards of $10,000, not including monthly maintenance fees.

Another advantage of using a professional website designer is that they would likely be more familiar with search engine optimization techniques and would therefore have a better chance of getting their sites to rank well in search engines such as Google™.

Large-Scale Managed Service Providers

Looking to bridge the gap between using the free WordPress™ software with ready-made templates and the expensive professional design shops, a new breed of service providers arrived on the scene promising to keep costs down, yet still offer a mostly hands-off approach to maintaining a meaningful Internet presence. These new service providers frequently specialize in just one or two vertical markets and often work with hundreds, and sometimes thousands, of businesses in the same industry or profession—for example, real estate or attorneys.

In the same vein as how large-scale website hosting companies such as Yahoo and GoDaddy™ have significantly lowered the cost of publishing do-it-yourself websites, these managed service providers have consequently lowered the cost of entry for small businesses in need of a fully managed solution.

These providers are able to offer an extreme level of service at greatly reduced costs by reusing a variety of highly-specialized and evolved industry-centric content over and over again as they take on new clients. To keep sites from looking too much like each other, they have in-house website specialists shepherd the production process and make whatever adjustments might be necessary to provide clients with distinctive and uniquely-looking websites.

Although the managed service provider model offers many clear benefits to customers, the model starts to fall apart when a provider reaches a certain saturation level within specific geographic markets. The problem is that it becomes difficult to constantly keep coming up with distinctively unique websites for competing customers in close proximity to one another when reusing the same content and trying to reduce labor costs.

Fully Automated Website Generation

The next frontier for vertical market managed service providers is to offer the same level of service as just described, but using a fully automated delivery model which would greatly reduce costs by eliminating the large labor component which has traditionally been required to provide the requisite level of service and customization.

Employing a fully automated website generation system could solve a large number of other traditional problems as well, such as keeping websites up to date with search engine optimization techniques and quickly integrating emergent Internet technologies such as mobile web, social networking, video and chat.

However, the problem with large-scale automation is that we suddenly find ourselves back to facing the same problem everyone's been fighting all along—identity. Automation leads to repetition and reuse of a limited set of content, and this is exactly what customers do not want.

The invention described herein is intended to address the aforementioned concerns as they relate to creating distinctively unique websites and marketing them in the search engines in the wake of increased automation being employed by service providers in order to reduce the cost of delivery.

The purpose of the invention described herein is to directly address the issue of repetition in the course of generating high-caliber vertical market websites without human intervention. By effectively solving this problem, extremely low-cost managed services can be offered to thousands of customers without running into the saturation issues which have traditionally stunted the growth of existing vendors.

The described methodology therefore paves the way for a new level of scale and economy which has otherwise yet to be achieved.

SUMMARY OF THE INVENTION

A method and system is disclosed for automatically generating a plurality of unique websites having conceptually similar content within a business market or profession, with each having a plurality of pages which are visually and structurally distinct, such that they may all coexist on the Internet in close geographic proximity without appearing to website visitors and search engines as being nearly identical to one another. The websites that are generated may also be hosted for users to provide a combined service for generating and hosting unique websites within a business market or profession.

In one embodiment the system starts by collecting simple profile information from customers which is used to shape and filter the selection of a plurality of pseudo random content retrieved from a database. The content consists of, but is not limited to, text, images, audio and videos.

Portions of the customer-supplied profile information are merged into placeholders contained within the selected content to further personalize it for that customer and a specific use, and then the entire collection of content is merged into customer-chosen prefabricated website templates and processed by a website generator.

The placeholders within website templates where content is injected includes both content which is displayed within browsers to website visitors, and invisible content which is intended to be read only by search engines.

The aforementioned steps for content selection and processing result in the system being able to generate a multitude of distinctively unique multi-page websites for customers with competing business interests. This is especially important when competing customers happen to be located close enough to each other whereby there is a likelihood that website visitors will view multiple competitors' websites while searching online for various products and services.

In addition to the websites being visually unique, website listings presented in search engines will also be unique.

The present invention facilitates the large-scale production of websites within a given vertical business sector using a completely automated procedure, which at the same time, is able directly address customers' requirements for having websites which appear to be custom made and manually optimized to perform well in the search engines.

In one embodiment the system may also keep track of the selected content which is assigned to websites, such that future generation cycles of a given website will retain the same content selections as originally made when such are still appropriate. Further, as website templates are enhanced to require additional content selections, future generation cycles automatically identify new or missing selections and will populate them from the database using the same procedure as just described. Additionally, in one embodiment customers may subsequently override or further personalize any of the randomly-selected content any time after the first generation cycle, after which, the newly-personalized content will be used for all future generation cycles thereafter until changed.

BRIEF DESCRIPTION OF THE DRAWINGS

FIG. 4 is a table of sample data excerpted from the random content database for a single sub-market record which contains multiple versions of text suitable for a single defined placeholder in the visual website template in accordance with one embodiment of the present invention.

FIG. 5 is a table showing several sample items of randomly-selected content from the database along with how this same content would look subsequent to the personalization process in accordance with one embodiment of the present invention.

DETAILED DESCRIPTION

The present invention is generally directed to systems, methods, and computer program products for generating and hosting unique websites. A service provider provides a user interface for clients to input commands to generate a website. The same service provider may also host the websites that are thus generated, although more generally the two functions may be separately provided.

Figure 1:
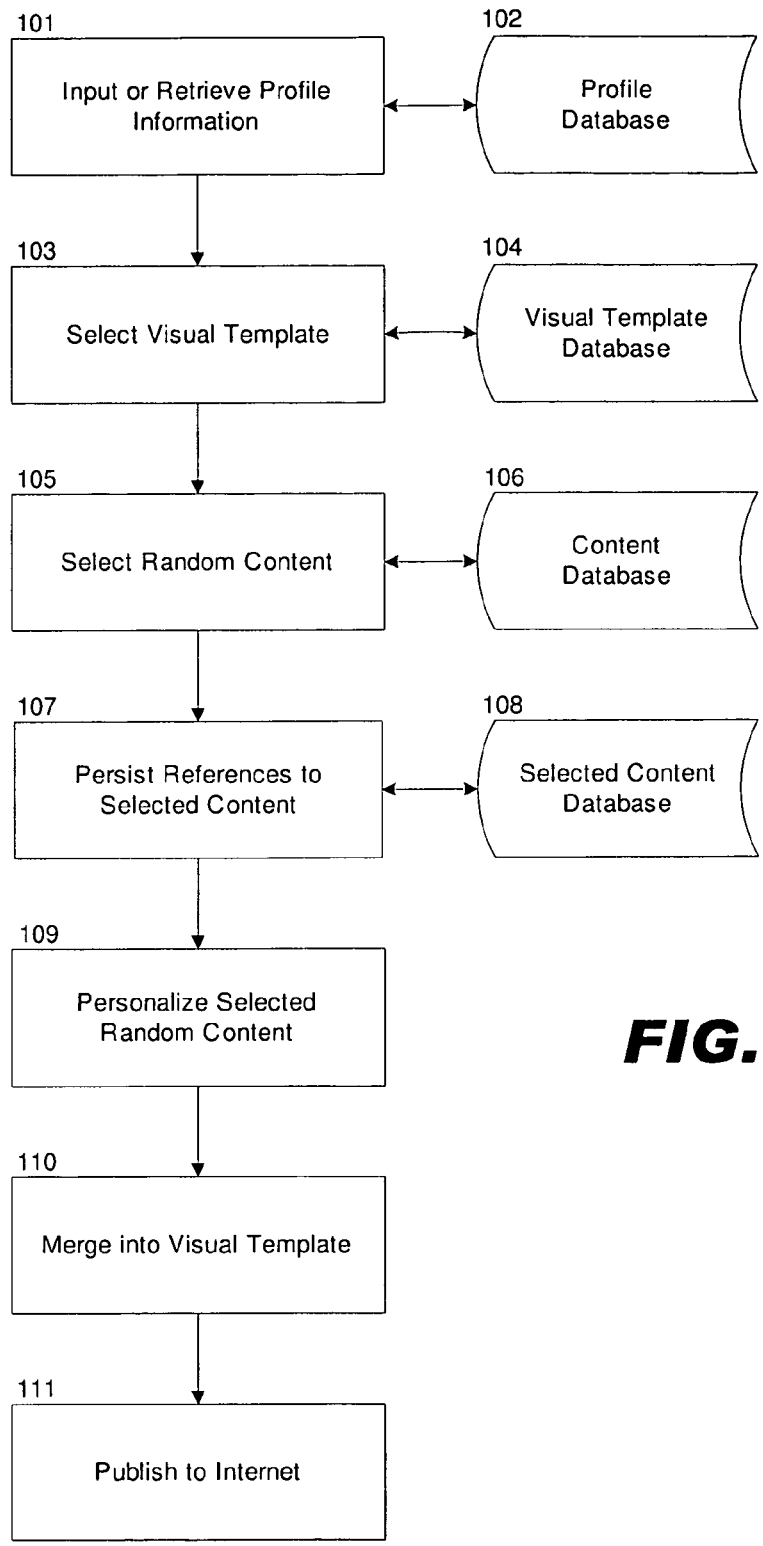
FIG. 1 is a flowchart illustrating an overall process in accordance with one embodiment of the present invention.

FIG. 1 is a flowchart which identifies a complete process from a high-level perspective for intelligently selecting random content from a database and merging it into a visual website template. As one example, the process may be implemented by a backend server associated with the service provider.

The process begins at 101 whereby a variety of profile information is collected from customers regarding their business details and personal preferences. This information would typically include, but is not limited to, name, address, phone number, hours of operation, geographic areas served and business market segments. This information may also include images, photos and videos; possibly including such items as logos, storefront photos and introduction videos. A corresponding user interface (not shown) may include data entry forms to collect profile information. The user interface may also include templates, a menu and drag and drop capabilities for a user to enter some selections.

Profile information is initially collected and captured using data entry forms filled out either directly by customers or by their respective sales representatives. Profile information is collected in multiple tiers; specifically, information which is global to the customer's entire organization, information which is applicable to a single storefront or office location, and information which is applicable to a single website to be constructed. Customers may operate multiple business locations and may purchase multiple websites. The tiered database organization is optimized to require the least amount of data entry.

All profile information is stored in a database 102 where it may later be recalled, modified, stored back and used during future website construction. Each time a website is generated, or re-generated, the entire collection of profile information is presented as input to the generator and used to guide or shape the generation procedure.

For each website to be published, customers must select a visual template 103 which represents the artistic look and feel of the resulting website. If the customer skips this step, the system automatically assigns a suitable default template. Templates typically include visual designs for a plurality of website pages, many of which include page-level options such as photo layout choices. Most website pages are optional and the system allows customers to individually determine which pages should or should not be included in their final published websites.

All visual template preference settings made either by the system or directly by customers are persisted in a database 104 where they may later be recalled, modified and stored back.

Website generation uses customer profile information 101 and visual template preferences 103 as its primary inputs. The visual templates include a plurality of placeholders for visual content (See for example FIG. 6, element 200) to be seen by website visitors, and invisible content (See for example FIGS. 7A, B, C, and D and search engine metadata elements 220) primarily intended to be seen by search engines and used to prepare business listings.

Figure 6:
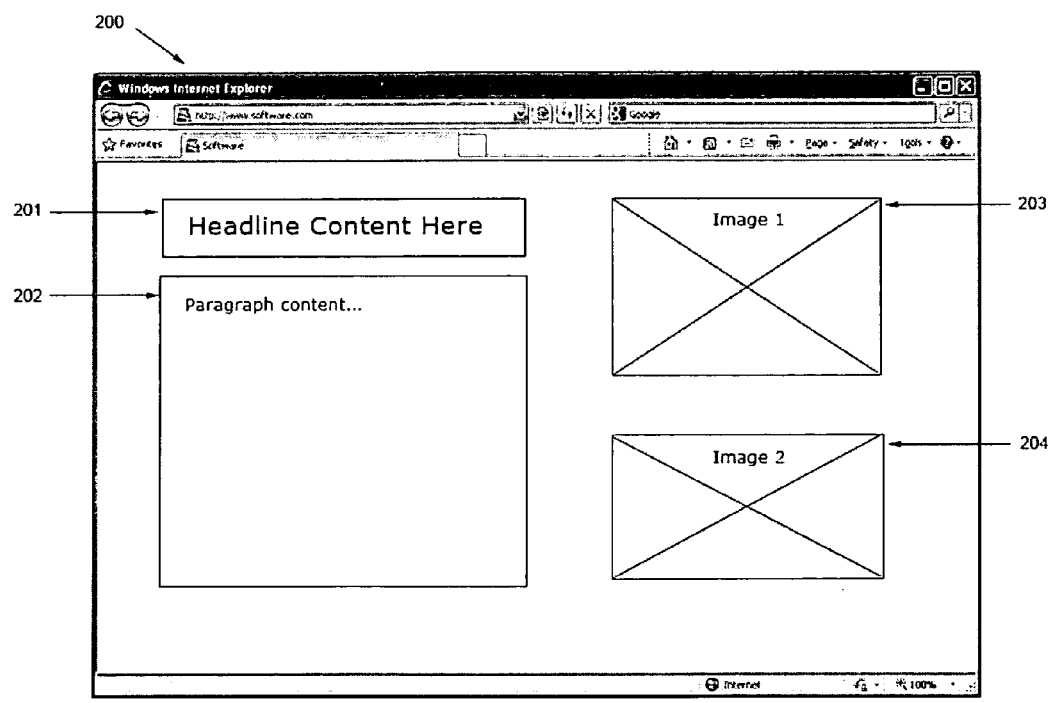
FIG. 6 is a picture showing visible placeholders in the visual website template which are filled in with personalized random content corresponding to content seen by website visitors in accordance with one embodiment of the present invention.

The website generator analyzes the visual template at step 105 and selects suitable content for each of the defined placeholders. Referring to FIG. 6, this drawing depicts a sample web page with a plurality of text and image placeholders (elements 201 through 204). This is only a sample representative design. Each page may have its own unique visual layout and content requirements. Content may include, but is not limited to, text, graphics, photos, audio and video. There is no limit to the number of placeholders which may appear on a single page or throughout the set of pages which comprise a visual template.

Figure 7A:
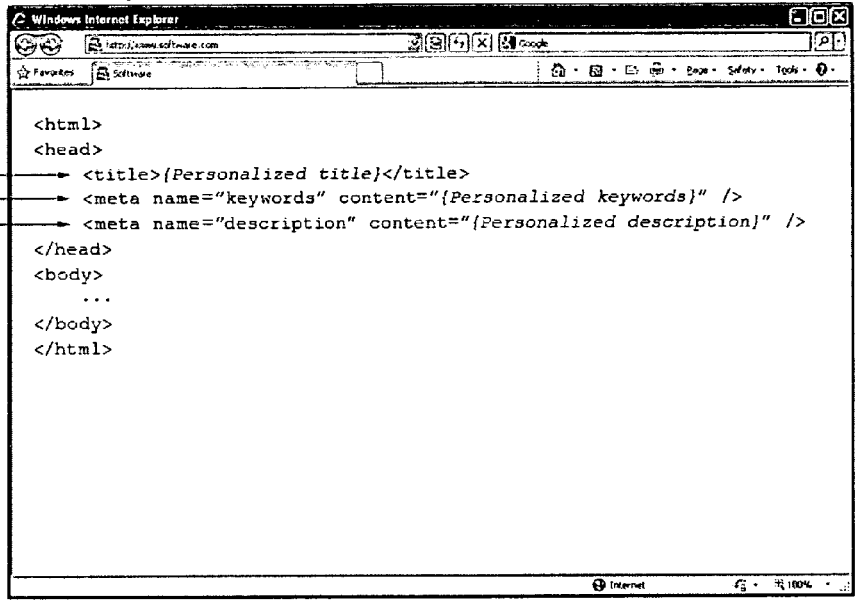
FIG. 7A is a picture showing invisible placeholders in the visual website template which are filled in with personalized random content corresponding to content read by search engines and used to shape the listings for the website in the search engine result pages in accordance with one embodiment of the present invention.
Figure 7B:
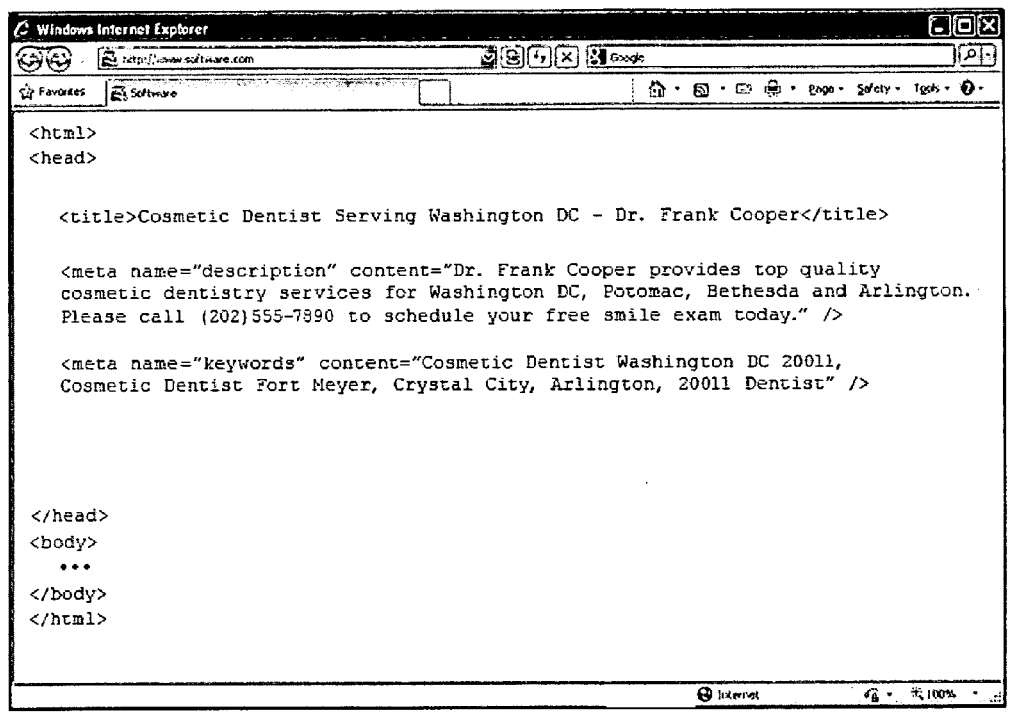
FIGS. 7B, 7C, and 7D show three examples of personalized random content within the invisible placeholders of FIG. 7A.
Figure 7C:
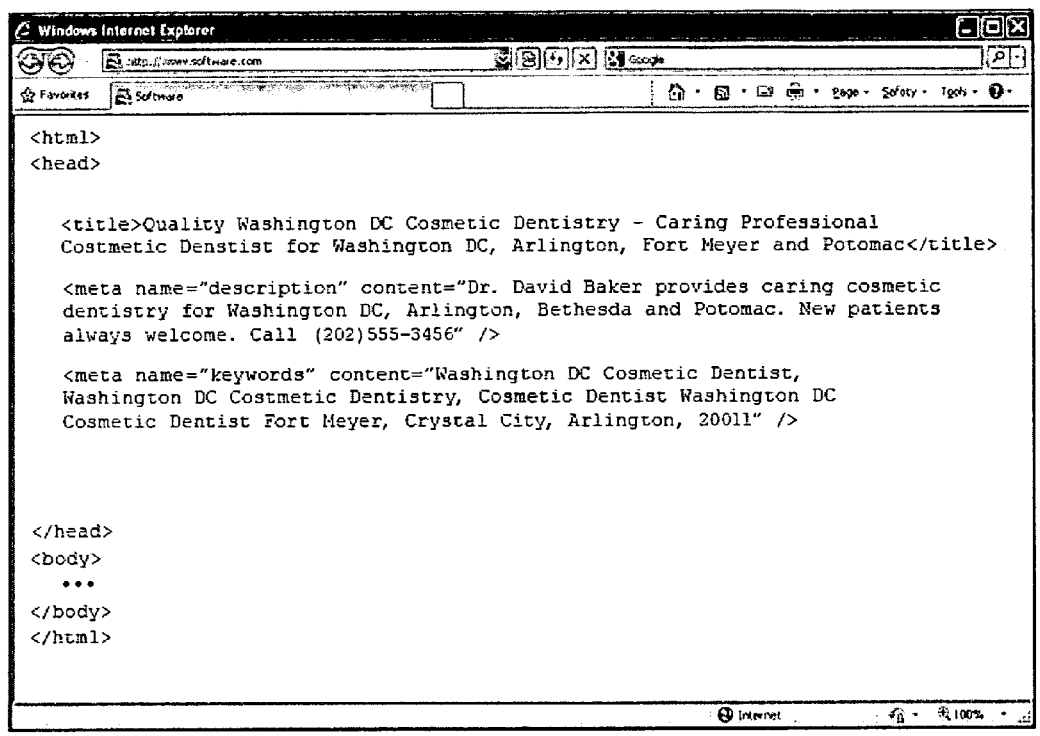
Figure 7D:
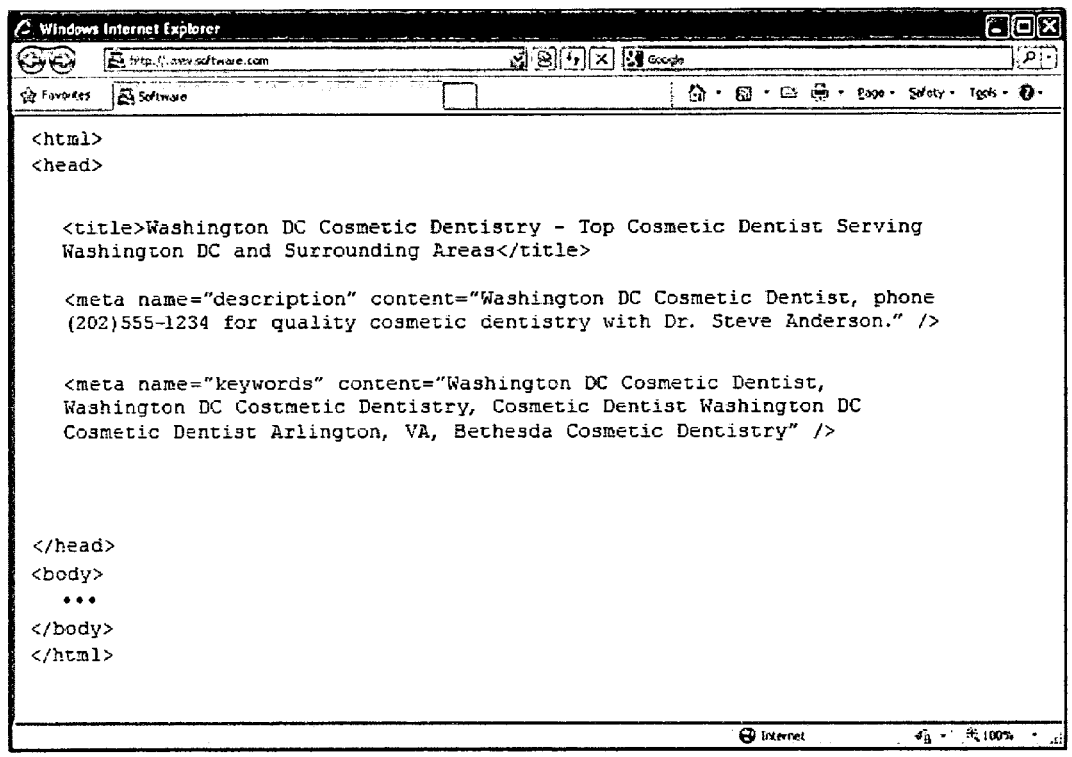
Figure 7E:
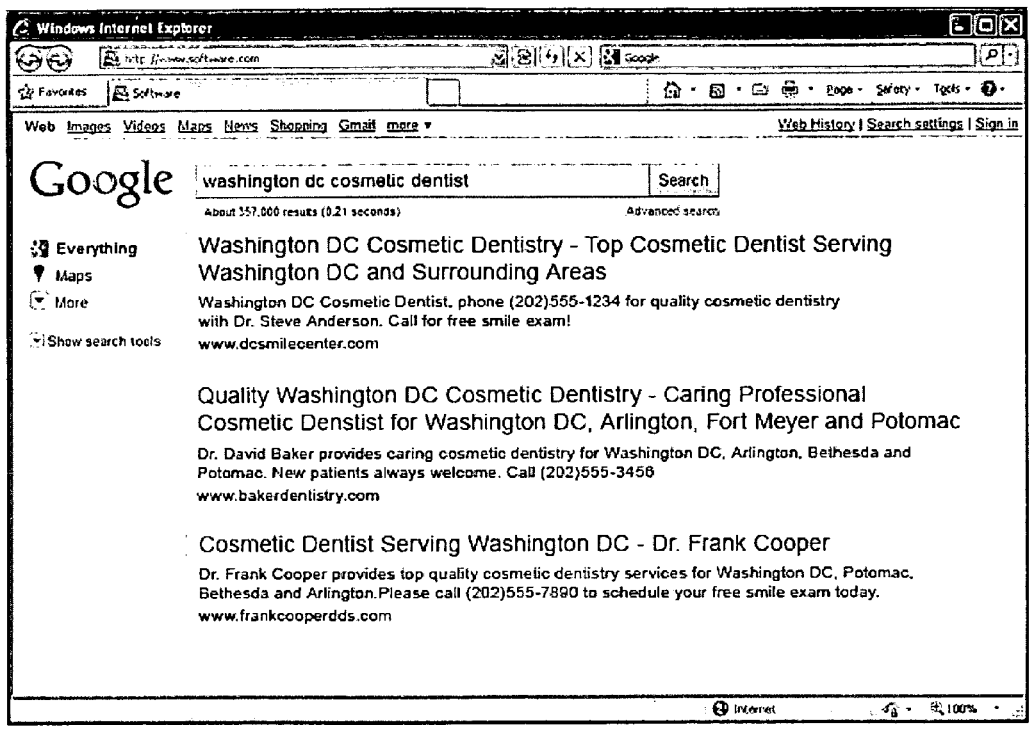
FIG. 7E illustrates the search engine result page corresponding to websites for FIGS. 7B, 7C, and 7D.

FIG. 7A identifies portions of a website template 220 which are not typically seen by website visitors, but are instead seen only by search engines (metadata elements 221 through 223). These normally-invisible portions of a website template are equally as important as the visual portions 200 and also include personalized content placeholders to be populated during the website generation process. FIGS. 7B, 7C, and 7D show three examples of personalized random content within the invisible placeholders of FIG. 7A. FIG. 7E illustrates the search engine result page corresponding to websites generated for FIGS. 7B, 7C, and 7D.

Figure 3:
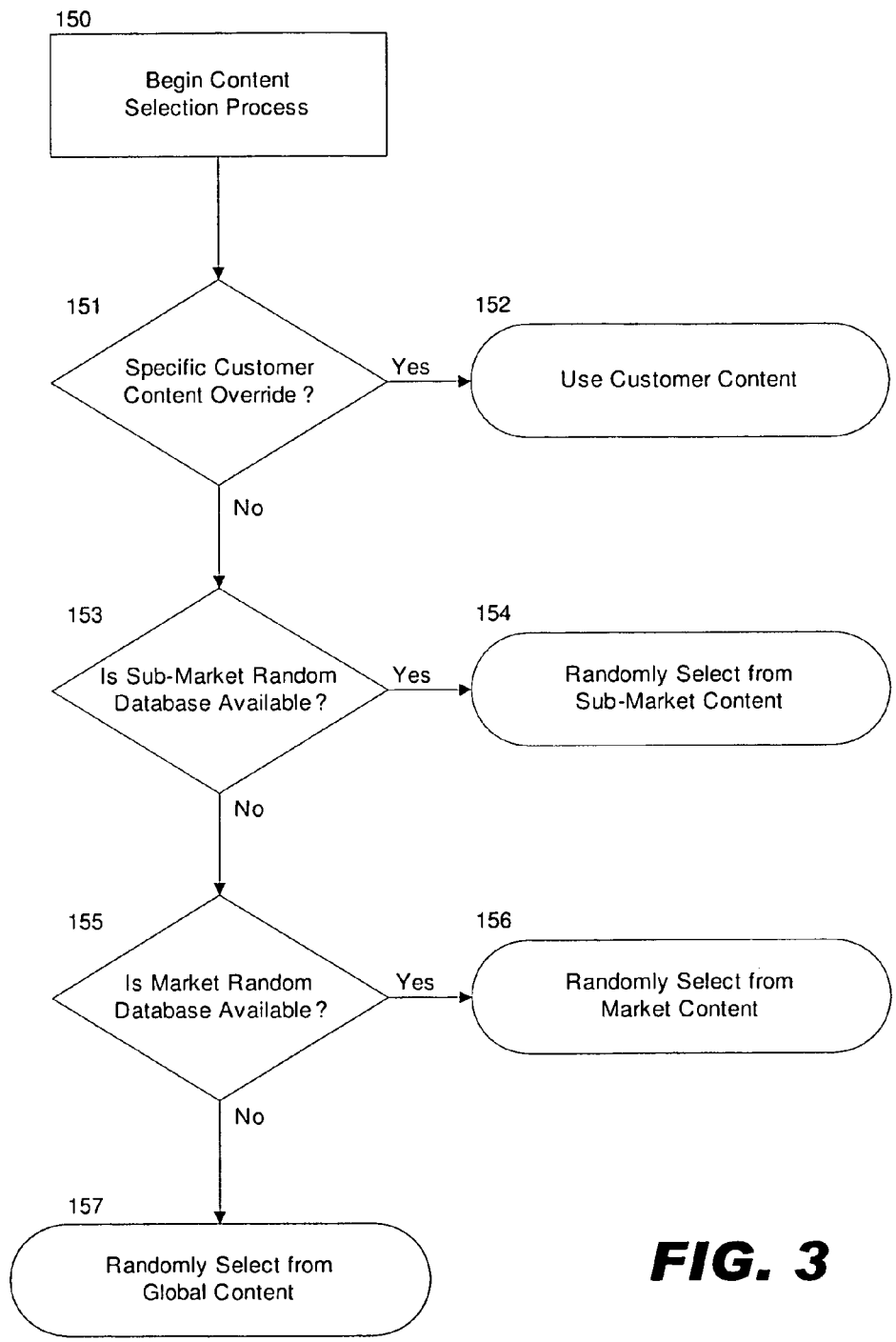
FIG. 3 is a flowchart showing in greater detail how content selections are made for each individual content placeholder to be filled within the visual website template in accordance with one embodiment of the present invention.

During processing step 105, after the visual template has been analyzed for required content placeholders, the system must perform the procedure illustrated by FIG. 3 for each piece of required content. This procedure is the same for text, graphics, photos, audio and video content.

The selection procedure begins at 150 whereby the properties and attributes of a specific placeholder to be populated are presented as inputs. These properties are included within the placeholder metadata stored alongside or within the visual templates. At the very least, one required property is the assigned name or identifier for the given placeholder.

At step 151, the system determines if the customer has provided a specific piece of content for the current placeholder. In most cases, they have not, which requires that the system should intelligently choose a suitable piece of content for that placeholder. When the customer has supplied specific content, that content is used as is and the selection process terminates.

In the more-usual circumstance whereby the customer has not provided specific content for a placeholder, at step 153 the system attempts to locate the best piece of content is has in its database 106 which would be appropriate for the current placeholder.

Figure 2:
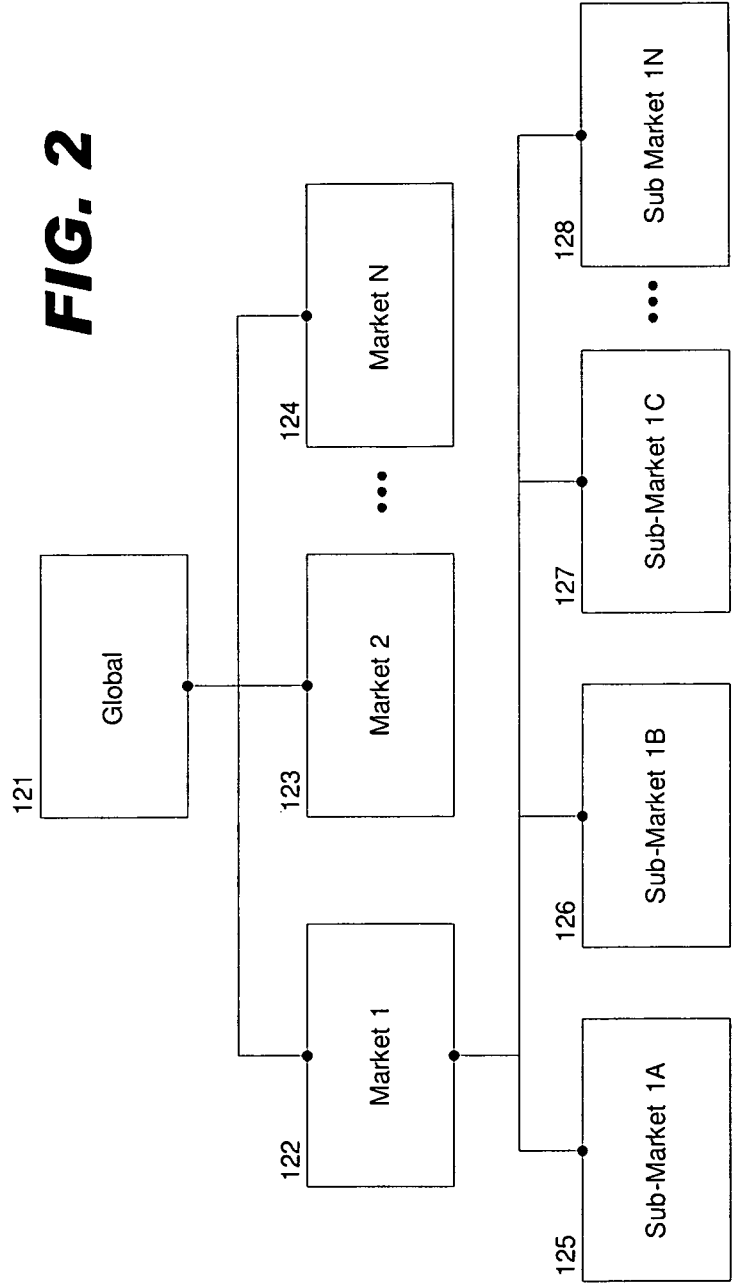
FIG. 2 is a diagram illustrating the organization of a database containing multiple levels of granularity for industry-specific random content in accordance with one embodiment of the present invention.

FIG. 2 illustrates the organization of the content database available to the system for populating placeholders. This chart identifies, but is not limited to, three tiers of filtered database content for a single placeholder. Data at the top tier 121 is very general and could apply to any business market. Data in the middle tier (122 through 124) is specific to a given business market or profession. Data at the bottom layer (125 through 128) is specific to a specialization of a given business market or profession.

The purpose for having data divided amongst multiple tiers is that the overall quality of automatically-generated websites is greatly increased by using content which is as specific as possible to the business specialty or discipline being promoted by the subject websites. With this being the case, database administrators populate each tier with content which is as targeted as possible.

The content selection process at step 153 begins searching the database at the lowest tier (125 through 128) hoping to find content which very closely targets the business specialty of the current website. In a given business market, for example, dentistry, specialization or submarkets might include braces, dentures and tooth whitening.

If the database does not contain any suitable content at the bottom tier, the system proceeds to step 155 and looks for content which would be applicable to the primary business market in general.

If the database does not contain any suitable content for the primary market, the selection process drops through to step 157 where content which is very general in nature is used.

The quality of the resulting websites is closely tied to the quality and quantity of data in the content database. As the database grows to include content covering a greater number of markets and sub-markets, so will the quality of the generated websites.

Once the selection procedure at steps 153, 155 or 157 has determined that the database contains content appropriate for the current placeholder, processing then proceeds to randomly choose from amongst the available choices within that portion of the database. This is illustrated in steps 152, 154 and 156. At a minimum, one choice must be available. There is no upper limit for the number of allowable choices. The greater the number of content choices available in the database, the greater the ability will be for the system to generate completely unique websites even when the original profile information from 101 is relatively similar between competing websites.

FIG. 4 is a table which includes a single set of sample random content 160 available in the database at 152. Similar, but less targeted content would be found at 154 and 156. This sample represents text copy which is intended to fill a visible placeholder on the home page of a dentistry website which is promoting cosmetic dentistry. The sample shows four different ways for writing the same introductory copy. The actual database may include any number of permutations of this content—the more, the better.

The text phrases in 160 also contain additional placeholders to be filled in during the personalization process at step 109 in FIG. 1.

Once the system has completed step 105 and selected a piece of content for each required placeholder in the visual template, at step 107 references to each selected item are persisted to a database 108 so that these same selections may be recalled and reused during future generation cycles for the same website. This makes the content stick to websites, as it would not be desirable to have the content seen by website visitors suddenly change simply because the website needed to be regenerated.

During each website generation procedure, the system always checks to see if there is an available and valid reference to a prior selection choice for each placeholder. Missing or invalid references are satisfied using the already-described procedure illustrated in FIG. 3. This is important and necessary because visual templates may be changed or enhanced at any time and the system must be able to dynamically adjust and regenerate any and all affected websites.

At step 109 (FIG. 1), the system begins the personalization process. This is where the random content is further customized by merging in profile information from 101. FIG. 5 is a table with several sample pieces of content from the database 170 which are personalized to result in the text at 171. Although the sample shows only textual content, the same applies to other media such as photos or videos. This procedure is performed for each content item retrieved from the database which will ultimately be used to populate a placeholder within the website visual template.

The personalization step is in important part of the system because it provides for yet another layer of abstraction to further separate the content which is displayed on otherwise similar websites.

Upon completing the personalization step 109, the system proceeds to step 110 where the personalized content is merged into the placeholders on the website's pages. FIG. 6 illustrates a sample page with placeholders for text (elements 201, 202) and graphics (elements 203, 204). The number and kind of placeholders varies from page to page. The system matches up content to its corresponding placeholders by matching up names or identifiers.

Similarly, FIG. 7 illustrates placeholders for several pieces of invisible content which are important for search engine optimization and the business listings displayed by search engines. Item 221 is the website title which displays at the top of the browser; but more importantly, is the website listing title displayed in search engine search results. Item 222 is personalized to contain targeted search keywords indicating the subject matter and business markets promoted by the website, and item 223 is populated with a personalized description of the website which will appear in search engine listings.

It is important to note that the items shown in FIG. 7A, including but not limited to 221, 222 and 223, are all placeholder content which are populated from the database using targeted random selections using the same procedure described for visual content. This is an essential part of the process because it is just as important to have unique search engine listings as it is to have visually unique websites.

The entire process illustrated by FIG. 1 is repeated for each website published by the system. The system is intended to service a plurality of customers each having one or multiple websites.

The specific randomization process employed by this invention ensures that website listings for a plurality of websites generated by this same system and displayed within a single set of search engine results will be distinctive and unique, even for competing customers in a small geographic area who may by nature have nearly identical profile information.

The same applies to the visual properties of websites. The randomization process ensures that the artistic look and the text copy within websites are distinctive and unique even when working from nearly identical profile information.

The system allows websites to be regenerated and republished to the Internet as often as needed. Since references to randomly-chosen content are maintained, customers may change their profile or preferences at any time and the system will reuse the same random choices, where possible and appropriate, yet apply the adjusted profile and preferences during the personalization phase.

A further benefit of this invention is that system administrators can make adjustments to the database content at any time and instantly regenerate all affected websites. For example, spelling corrections to text copy could be made, or entire text phrases could be re-crafted to gain better rankings in search engines. The same applies for images and any other form of media.

Returning again to FIG. 7E, in this example there are several dentists in the same geographic region (Washington, D.C). Each dentist has the same specialty (cosmetic dentistry). Each dentist wants to use their own website to advertise their services to potential customers. Using the method and system of the present invention, each dentist may generate their own unique website in a short period of time by inputting their individual profile information and any selections of visual templates. As illustrated in FIG. 7E, the respective websites also appear as unique websites in search engine listings. That is, each dentist has a different description in the search engine listings. Thus, for example, if a person seeking a cosmetic dentist inputs "cosmetic dentist" and the geographic area into the search engine they will not be confused by identical-looking search listings for the different dentists.

It can also be seen in FIG. 7E that the invisible content used by the search engine to generate search listings can be optimized to display relevant information such as the dentist's name, phone number, and other information. That is, in addition to provide a unique search engine listing, the present invention permits a web hosting service to provide its clients with search engine results that are optimized in terms of providing relevant information to potential customers and to optimize placement in search engine results.

One aspect of the present invention is that while the invisible content includes a selection of random invisible content, the randomized invisible content still retains the core information required for search engine optimization. As can be seen in FIGS. 7B, 7C, and 7D, the invisible content in items 221, 222, and 223 may include information common to more than one website. In these examples, items 221, 222, and 223 contain as common content the geographic area (Washington, D.C.) and the same specialization (Cosmetic Dentist). However, other aspects of items 221, 222, and 223 are random selections resulting in a different format of the search engine listing. That is, in the result as illustrated in FIG. 7E each of the three dentists has a meaningful (but different) title in the search engine (e.g., "Washington D.C. Cosmetic Dentistry," "Quality Washington D.C. Cosmetic Dentistry," and "Cosmetic Dentist Serving Washington D.C.") along with different (but meaningful) descriptions of their services showing up in the search engine listing, including a different ordering of elements with a different sentence structure. Thus, the randomization is performed in a way to effectively guarantee that each dentist in this example gets a search engine listing having a format with a different look and feel. Moreover, the format is still meaningful and useful as a means to establish identity and attract business. As a result, the present invention is consistent with search engine optimization in that each dentist's website may have keywords and metadata chosen to optimize search engine placement. Additionally, the web hosting service may automatically update the search engine optimization for each website, such as by performing automatic updates of keywords as search engine technology evolves. This relieves customers from the burden of trying to pick and update keywords for search engine optimization.

Some aspects of the present invention related to the example of generating dentist websites in Washington, D.C. can be contrasted with the problems that would occur if prior art techniques were used. The degree to which the format of visible and invisible content must be varied depends in part on the application. Studies by the inventor indicate that there is particular problem in vertically integrated markets for hosting websites for particular business and professions. Research and experience by the inventor indicates that customers begin to complain about these issues when the number of nationally-distributed websites serviced by a single vendor in the United States approaches 1,000 and conventional prior art automated website design techniques are used having essentially identical content for each user. As that number approaches 2,000, it becomes nearly impossible to attract new business because in any reasonable-sized geographic market the hosted websites for professionals in the same line of business look too similar when prior art automation techniques are used.

The reason for these thresholds is simple. When the national numbers rise above certain numbers it means that it becomes statistically likely that in any large geographic market there will be at least two websites hosted by the same service and hence a likelihood that conventional template approaches would generate similar looking content and web site search engine listings. As an illustrative example, for the case of dentistry consider a city such as Washington D.C. In 2011 the population of Washington, D.C. is approximately 600,000 people but due to the influx of commuters the population rises to over one million people during the work week. In 2011 the US population is estimate to be approximately 308 million people. Assuming that dentists are approximately uniformly distributed according to population, then 1000 national dentist websites hosted by a single service would correspond to approximately 1000×1/308=3.2 dentist websites within an urban center having a population of one million people, assuming dentists are evenly distributed according to population. However if we consider the larger Washington-Baltimore Metro market which has over 8.2 million people then in this example if there are 1000 national dentist websites we would expect on average there to be 26.6 listings in the Washington-Baltimore Metro market.

Of course, the U.S. population is steadily increasing and businesses in a particular industry seeking web hosting services are not always uniformly distributed by population. More generally, it can be appreciated that the threshold problem is related to the fact that saturation is likely to occur when the total number of websites in a vertical market corresponds to two or more within the same geographic market such that two or more identical search engine listings might be generated in the same market using conventional techniques. The present invention provides a solution to this saturation problem by customizing both the visual content and the search engine listing to support two or more websites for businesses in the same general field and same geographic market. Additionally, the customization can be extended to sub-markets and specialties, if desired, to support two or more websites in sub-market or specialties in the same geographic area and provide unique search engine listings and content format for each website. Thus, it can be appreciated that the present invention permits a fundamental increase in the degree to which website hosting services can be provided in vertical industries or professions without generating the saturation problems associated with prior art techniques.

The present invention is applicable to generating unique websites for a wide variety of vertical industries or professions. For the case of a specific profession, the content choices may be customizable to mimic the quality and level of detail of hand crafted websites in that profession.

As an illustrative example, consider dentistry. In the case of dentistry, a website could have anywhere from 100 to 200 pages and may contain upwards of 500 placeholders. A large database of pre-sized images is provided that matches up with the placeholders, as well as a huge database of pre-written copy. For each image or text placeholder, the database contains multiple pieces of content which would be suitable to plug into that slot (possibly dozens in some cases). For dentistry, an exemplary database may contain nearly 10,000 unique pieces of prepared content. When a website is produced, computer logic selects a piece of content from the database for each placeholder in the customer-selected website template. The process first filters down the available choices of suitable content based on simple profile information collected from the customer, and then randomly selects from the choices which remain. It then keeps track (remembers) of which choices were made for all the placeholders in a given website. This process is scalable and has the ability to produce thousands, if not millions, of unique websites which are prepared in a few seconds and ready to be further customized by clients if they so desire. The websites will be unique by nature. Making changes therefore becomes a personal choice rather than an absolute requirement for the website to be successful.

Figure 8:
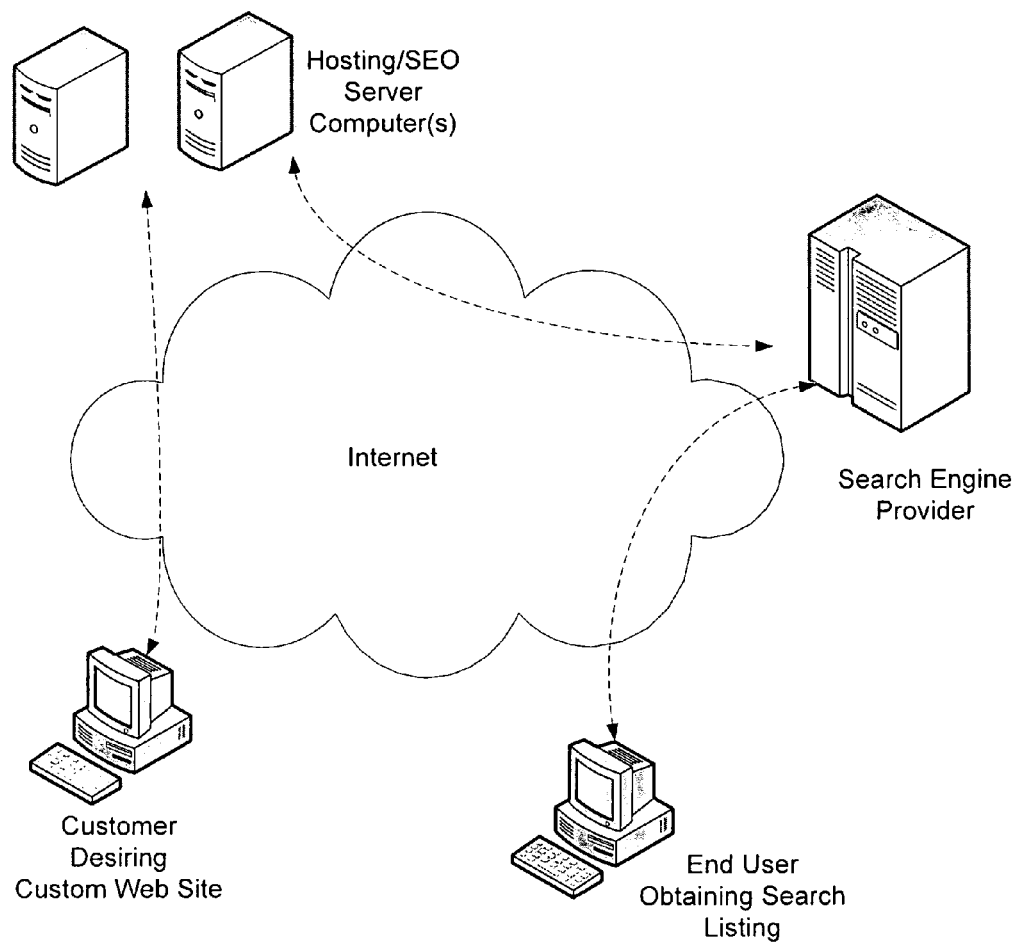
FIG. 8 illustrates an exemplary system environment in accordance with one embodiment of the present invention.

FIG. 8 illustrates an exemplary system environment. The service provider would have hardware to support the service, such as at least one server computer having at least one processor chip. For example, a first server may include a processor and one or more database for storing content and computer program code for implementing any of the previously described methods in response to user profile data in order to generate a website. A web server may also be provided to support hosting the website. The servers would thus include the accompanying databases and memories, i.e., a computer readable storage medium to store the software program, processors to execute the computer programs, databases to store content and any other required information, and any necessary web servers to support web hosting. Thus the service provider hosts the web pages and a search engine indexes the hosted pages.

As previously described, in a preferred embodiment random selections of at least some of the visible and invisible content is used to generate unique websites and search engine listings for customers in the same market. The choices are pseudo-random but of course the end result is that the content and search engine listings are still meaningful to an end user. Thus in the case of visible content, the individual content materials include a selection of meaningful materials that can be randomly selected, arranged, or otherwise combined with profile data in a way that generates a meaningful result to the consumer. Similarly for invisible content, the metadata includes portions that are randomly selected from a set of potential choices but selected and arranged in a manner that generates a meaningful search engine listing.

Making pseudo-random selections within a large number of possible choices, formats, and arrangements of visible and invisible content helps to ensure a different look and feel of each website and listing because each website in any given geographical market is thus likely to have a different format. However, more generally other selection techniques could alternately be used, such as iteratively going through a sequence of selections or permutations of content choices, arrangements, and formats. Additionally, it would be understood that automated checking techniques, such as semantic analysis techniques, could be used to confirm that the results are different and meaningful. That is, the objective is to automatically create websites and search engines that have a different appearance when consumers attempt to search for information. Making random selections is merely one way to make the selections from a database of potential choices but it would be understood that other techniques could be used to create an equivalent end result, namely websites in a vertical industry in which websites in the same geographic area have a sufficiently different content attributes, format, and arrangement of visible and invisible content to have a different look and feel and show up differently in search engine listings.

Many alternate embodiments are contemplated. One implementation option is that the generation of content and the related content databases can be isolated from the eventual "serving" of the combined content via a hosting service. For example, cloud hosting could be used to serve up web pages while a service provider may use its own datacenter computers to manage content generation. In many applications it would typically be desirable to figure out the choices for visible and invisible content choices together as a matched set in order to make it simple and easy for a user to build a website that is unique and capable of search engine optimization. However, while embodiments of the invention are described in regards to a service provider providing both hosting and search engine optimization, it will also be understood that these two functions could be performed separately. For example, in some applications the search engine optimization using invisible code with unique features could be provided as a separate feature for use by a separate hosting entity or user.

Embodiments of the present invention provide many advantages over the prior art. Customers are always in a hurry to publish newly-purchased websites. In this rush to get online, they do not typically have the time to write dozens of pages of copy and come up with all the images, photos and videos which may be required. They also may not possess the necessary copywriting skills or knowledge about how to write effective website copy. Furthermore, as more and more customers in the same business market utilize this same system for automated website construction, there becomes a greater likelihood that website visitors will come upon more than one site created by this system during any given Internet surfing session. It is important to customers that their website visitors not perceive that their sites were all generated from the same source material. Sites need to be distinctively unique, as do their search engine listings. The system, method, and computer program product of the present invention accomplishes this very critical objective.

Another advantage of this invention which is important from the perspective of the Internet service provider or vendor of the website hosting service, is that this process allows a large number of competing customers within a small geographic area to all patronize the same vendor and instantly create automated websites—all having unique content. In the absence of this process being used, only a very small number of competing customers would typically be willing to patronize the same website hosting provider due to concerns that their websites would look too similar to the websites operated by their nearby competitors.

The present invention therefore greatly increases the scale of product distribution which becomes possible for a single hosting provider, and consequently, greatly increases the amount of revenue attainable in specific business and geographic markets. In contrast, the prior art provides only a limited ability to automate the design of websites. Comparatively little has been done to automate the process in a way that would generate a different looking website for different users when there are a large number of users in a specific business area or profession. Additionally, the prior does not provide a satisfactory solution for users to obtain a unique website that also shows up as a unique site in search engine listings. In particular, the prior art does not provide satisfactory solutions intended to curb the growing potential for duplicate titles and descriptions in Search Engine Result Pages (SERPs). Also, the prior art does not appear to provide a means to relieve users from Search Engine Optimization (SEO), understanding keywords, picking keywords, etc. Specifically, prior art automated generation methodologies requires users to pump in their own SEO information.

The present invention also overcomes the traditional saturation problem encountered when many customers in the same business sector who are located in close proximity to one another purchase template-based websites from the same supplier. Absent the techniques employed by this invention, these websites would all have a similar look and feel, resulting in a high level of customer dissatisfaction once a certain saturation threshold has been reached.

From the perspective of individual businesses, competing for top placement in the search engines often represents a significant challenge for most businesses. Even though most people do not understand how search engines arrive at their results, everyone knows that a top slot on the first page is extremely valuable and will drive considerably more traffic than a link buried several pages down the list.

Almost everybody who has ever published a website can tell you where they rank at that minute in top search engines like Google. They can also tell you who is edging them out for better position and relentlessly agonize over what can be done to move up the list.

Here again, identity is paramount, and nobody wants their listing in Google to be similar to a nearby competing listing. This is even more important for businesses offering local services since they are often personally acquainted with their competitors; which introduces an emotional aspect which often eclipses the technical issues to be worked out.

Maintaining control of search engine listings can be a daunting task for people outside the trade who are not familiar with HTML. They don't often realize that special codes are required to be invisibly embedded into web pages for the sole benefit of the search engines. This problem is amplified when adjacent competitive listings in Google contain identical text. This can easily happen when several businesses purchase the same stock template from a popular supplier and nobody realizes these invisible codes need to be customized.

The invention described herein addresses these issues relating to invisible search engine metadata, such as search engine titles, keywords and descriptions by employing automation techniques to craft unique and meaningful search engine meta data without manual intervention whilst at the same time not running into the traditional saturation limitations traditionally encountered by service providers when working with multiple customers located in the same general area.

The present invention may also be used to solve the saturation problem associated with hosting websites in given geographic market. Without such a solution in place, even the most elegant of automated platforms will quickly be stifled once a certain saturation level is reached within given geographic markets. Research and experience by the inventor indicates that customers begin to complain about these issues when the number of nationally-distributed websites serviced by a single vendor approaches 1,000. As that number approaches 2,000, it becomes nearly impossible to attract new business because in any reasonable-sized geographic market the hosted websites for professionals in the same line of business look too similar when prior art automation techniques are used.

For an area such as hosting dentistry websites, within which the inventor has considerable experience, this represents less than two percent of the total market. It therefore follows that if there is any hope of attaining a market share upwards of ten percent or higher, such could only be accomplished by way of a solution which directly addresses customers' express desire to have uniquely crafted websites and search engine listings—and it has to be accomplished without asking the customers to write their own content, because that is what they were hoping to outsource in the first place.

The system also provides other benefits. In one implementation, search engine optimization is also provided in addition to web hosting and the generation of a unique website. Thus, the customer receives a website that is unique, appears unique in search engine listings, and that is also optimized for search engine listings.

What is claimed is:

1. A computer implemented method for generating and hosting a unique website by a hosting service comprising at least one computer, comprising:

receiving, at the hosting service, user profile data;

selecting, by the hosting service, a choice of visible user content to be displayed on a user's website based on the user profile data;

selecting, by the hosting service, a choice of personalized invisible content to be included on the user's website based on the user profile data including targeted search keywords, a personalized business title, and a personalized business description;

the hosting service generating the personalized business title and personalized business description by making a selection from a set of choices in a database for invisible content and merging user profile data with the invisible content;

generating and hosting a unique website for the user, the unique website being different in format and arrangement than other websites hosted by the hosting service;

maintaining uniqueness of the unique website, including persisting placeholder references, by the hosting service, to the selections from the database of visible content and invisible content for the unique website and eliminating an identical set of selections from use in websites by other users of the hosting service;

wherein the invisible content is read by a search engine to generate a unique search engine listing including the personalized business title and personalized business description with the targeted search keywords initially selected and subsequently adjusted by the hosting service for search engine optimization.

2. The method of claim 1, wherein selecting a choice of personalized invisible content includes making random selections from a set of choices in the database and merging user profile data to generate a unique title descriptive of a business.

3. The method of claim 2, wherein selecting a choice of personalized invisible content includes making a random selection from a set of choices in the database and merging user profile data so that the personalized business description includes at least one meaningful sentence with a sentence structure and ordering of elements different than other hosted websites.

4. The method of claim 1, wherein maintaining uniqueness of the unique website includes the hosting service utilizing persisted placeholder references to perform selective updates to portions of content of the unique website.

5. A computer implemented method for generating and hosting a unique professional website by a hosting service comprising at least one computer, comprising:

receiving, at the hosting service, user profile data;

selecting, by the hosting service, a choice of visible user content to be displayed on a user's website based on the user profile data and visual templates for a market including at least a geographic area, a general market area for a profession, and sub-market areas for the profession;

selecting, by the hosting service, a choice of invisible content to be included on the user's website as content read by a search engine including attributes chosen from the user profile data merged with other search engine metadata chosen for the market, the invisible content including a unique website title, targeted search keywords, and a personalized business description of the website that is unique within at least the geographic area, the personalized business description including at least one descriptive sentence that is different than the unique website title;

generating and hosting a unique website for the user, the unique website being different in content structure than other hosted websites in a same geographic market and having invisible content selected to generate a unique listing in a search report that includes the personalized business description;

persisting placeholder references, by the hosting service, to selections of visible user content and invisible content for the unique website of the user and other unique websites hosted by the hosting service;

performing, by the hosting service, selective updates to a portion of content of the unique website, including utilizing persisted placeholder references to maintain uniqueness of the unique website from other unique websites hosted by the hosting service; and performing, by the hosting service, search engine optimization for the unique website, including initially selecting the targeted search keywords and adjusting the targeted search keywords of the invisible content for search engine optimization.

6. The method of claim 5, wherein selecting a choice of visible user content comprises making a random selection from a set of choices in a database for a series of content selections for the market and merging user profile data with the selection so that a website that is generated has a unique look and feel compared with other hosted websites in the same geographic market.

7. The method of claim 5, wherein selecting a choice of invisible content comprises making a random selection from a set of choices in a database for the market and merging user profile data so that the unique listing is optimized for at least one search engine and the personalized business description includes a sentence structure and ordering of elements different than other hosted websites such that the unique listing has a unique look and feel.

8. The method of claim 5, further comprising updating, by the hosting service, at least one aspect of the invisible content for search engine optimization.

9. The method of claim 5, further comprising updating, by the hosting service, the visible content for search engine optimization.

10. A computer implemented method for search engine optimization of a website, comprising:
receiving, at a hosting service comprising at least one computer, instances of user requests with each user request providing user profile data for a different user website;
for each user, the hosting service generating custom invisible metadata content read by a search engine, the custom invisible metadata content for each user including attributes chosen from the user profile data and further including a selection of other content unique to each individual user website in a selected geographic region; wherein the custom invisible metadata content includes a website title, search keywords targeted for search engine optimization, and a description having a personalized business description;
for each user, the hosting service maintaining uniqueness of respective websites for subsequent updates of visible and invisible content by persisting placeholder references indicative of content selection choices and utilizing the persisted placeholder references to ensure that each hosted website has a unique set of content selections with individual pieces of content being adjusted by the hosting service for search engine optimization.

11. The method of claim 10, wherein a random selection is made for the selection of at least some of the invisible content.

12. A system, comprising:
a processor to execute computer program instructions for web site generation and hosting;
a database to store content information for designing a website, including a selection of visible content and invisible metadata content choices for at least one vertical industry;
a server computer to host websites generated by the system; and
the system generating and hosting a website for each user in which selections of visible content choices are implemented by the system from a selection of visible content and additional selections of the invisible metadata content choices are chosen from the database and merged with user profile data such that the system generates a unique website with a unique search engine listing for each website that is hosted;
wherein at least a portion of the invisible metadata content choices in a description of each website is randomly selected from a set of invisible content choices to generate a personalized business title and a personalized business description in the unique search engine listing and targeted search keywords are selected by the system for search engine optimization;
wherein the system maintains uniqueness of the unique website, including persisting placeholder references to the selections from the database of visible content and invisible content for the unique website and eliminating an identical set of selections from use in websites by other users of the system; and
wherein the invisible content is read by a search engine to generate the unique search engine listing including the personalized business title and the personalized business description with the targeted search keywords initially selected and subsequently adjusted by the system for search engine optimization.

13. The system of claim 12, where the system supports a user interface for a user to input user profile data, the system in response merging profile data with visual templates and invisible content to host a unique website structure for each user website in a geographical market of a profession and with a unique search engine listing format for each website in the geographical market.

14. The system of claim 12, wherein at least a portion of the invisible metadata content choices in each web page is randomly selected from a set of choices to generate a unique search engine listing within a market.

15. The system of claim 12, wherein the website that is generated has a unique look and feel compared with other hosted websites in a geographic market and the generated website generates a unique listing in the search report associated with the geographic market.

16. A computer implemented method performed by a hosting service comprising at least one computer to host a unique professional website, comprising:
receiving user profile data;
selecting a choice of visible user content to be displayed on a user's website based on the user profile data and visual templates, wherein a selection of visible content further includes making a random selection of content choices from a database of pieces of content, personalizing the random selection of content choices, and merging the personalized random selection of content choices into the visual templates;

persisting placeholder references to the random selection of content choices, wherein each placeholder reference indicative of a location of each piece of random content selected for the user's website;

utilizing the persisted placeholder references to ensure that each hosted website has a unique set of content selections;

selecting a choice of invisible content to be included on the user's website as content read by a search engine to generate a personalized business description of the website;

hosting a unique website for the user that includes the choice of visible content and personalized business description in the invisible content; and performing, by a system administrator of the hosting service, search engine optimization for the unique website including:

incrementally adjusting one or more pieces of visible content in the database of pieces of content for search engine optimization, and regenerating and republishing the unique hosted website to implement a change in only the one or more pieces of adjusted content; and adjusting the invisible content for search engine optimization;

wherein the unique hosted website retains an initial organization defined by the random selection of content choices to maintain a unique random selection of content choices, and individual portions of the unique hosted website are adjusted by the hosting service to provide search engine optimization.

17. A computer implemented method for hosting a unique professional website, performed by a hosting service comprising at least one computer, comprising:

receiving user profile data;

selecting a choice of visible user content to be displayed on a user's website based on the user profile data and visual templates, wherein a selection of visible content further includes making a selection of content choices from a database of pieces of content, personalizing the selection of content choices, and merging the personalized selection of content choices into the visual templates;

selecting a choice of invisible content to be included on the user's website as content read by a search engine to generate a personalized business title and a personalized business description of the website including at least one meaningful sentence;

hosting a unique website for the user that includes the choice of visible content and the personalized business title and the personalized business description in the invisible content;

persisting placeholder references to the selection of content choices from the database of pieces of content and utilizing the persisted placeholder references to ensure that other hosted websites do not have the same selection of content choices; and performing, by a system administrator of the hosting service, search engine optimization for the unique website including selecting targeted search keywords in the invisible content;

wherein the unique hosted website retains an initial organization defined by the initial selection of content choices, and targeted search keywords and individual portions of the unique hosted website are adjusted by the hosting service to provide search engine optimization.

* * * * *